United States Patent [19]

Billman

[11] Patent Number: 5,734,504

[45] Date of Patent: Mar. 31, 1998

[54] MULTI-BEAM ILLUMINATOR LASER

[75] Inventor: Kenneth W. Billman, Mountain View, Calif.

[73] Assignee: Lockheed Martin Corporation, Sunnyvale, Calif.

[21] Appl. No.: 761,073

[22] Filed: Dec. 5, 1996

Related U.S. Application Data

[60] Provisional application No. 60/008,614, Dec. 14, 1995.

[51] Int. Cl.$^6$ ............................................. G02B 27/10
[52] U.S. Cl. ........................................................ 359/618
[58] Field of Search .................................. 359/619, 626, 359/629, 618; 362/268; 385/33, 35; 369/284; 430/945; 372/23

[56] References Cited

U.S. PATENT DOCUMENTS

| | | | |
|---|---|---|---|
| 3,702,929 | 11/1972 | Burch | 362/268 |
| 3,899,145 | 8/1975 | Stephenson | 356/4 |
| 4,003,659 | 1/1977 | Conrad et al. | 356/141 |
| 4,229,103 | 10/1980 | Hipp | 356/141 |
| 4,523,809 | 6/1985 | Taboada et al. | 359/577 |
| 4,770,482 | 9/1988 | Sweeney et al. | 385/115 |
| 4,965,453 | 10/1990 | Hoschette et al. | 372/50 |
| 5,016,149 | 5/1991 | Tanaka et al. | 362/259 |
| 5,060,237 | 10/1991 | Peterson | 372/97 |
| 5,243,619 | 9/1993 | Albers et al. | 372/98 |
| 5,272,715 | 12/1993 | Guerin | 372/75 |
| 5,351,259 | 9/1994 | Ishimori et al. | 372/75 |
| 5,463,497 | 10/1995 | Muraki et al. | 359/618 |
| 5,465,265 | 11/1995 | Ota | 372/101 |
| 5,477,384 | 12/1995 | Nishikawa et al. | 359/619 |
| 5,568,318 | 10/1996 | Leger et al. | 359/618 |
| 5,568,580 | 10/1996 | Saitoh et al. | 358/46 |
| 5,585,921 | 12/1996 | Pepper et al. | 356/432 |

*Primary Examiner*—David C. Nelms
*Assistant Examiner*—Ricky Mack
*Attorney, Agent, or Firm*—Feix & Feix

[57] ABSTRACT

The present invention is directed to a multi-beam illuminator laser apparatus and method for providing improved uniformity of laser beam illumination of a distant target or remote object, even in the presence of changing atmospheric conditions. The invention provides a diameter-adjustable array consisting of a variable number of co-parallel, mutually incoherent, polarization-aligned, waist size- and position-adjustable beamlets. The invention includes a beam divider which efficiently uses input or source laser power and because of this may be driven by as few as one laser or by as many as n lasers, where n is equal to the beamlet number. The invention is capable of rapid adjustment of beamlet number and beamlet positions in the field which allows determination of the optimum number of beamlets to use. Finally, as the total number of beamlets and possibly their positions are varied, the individual beamlet powers are maintained equal to each other and the overall beamlet array power is easily held constant by choice of the stage angles within the beam divider.

12 Claims, 3 Drawing Sheets

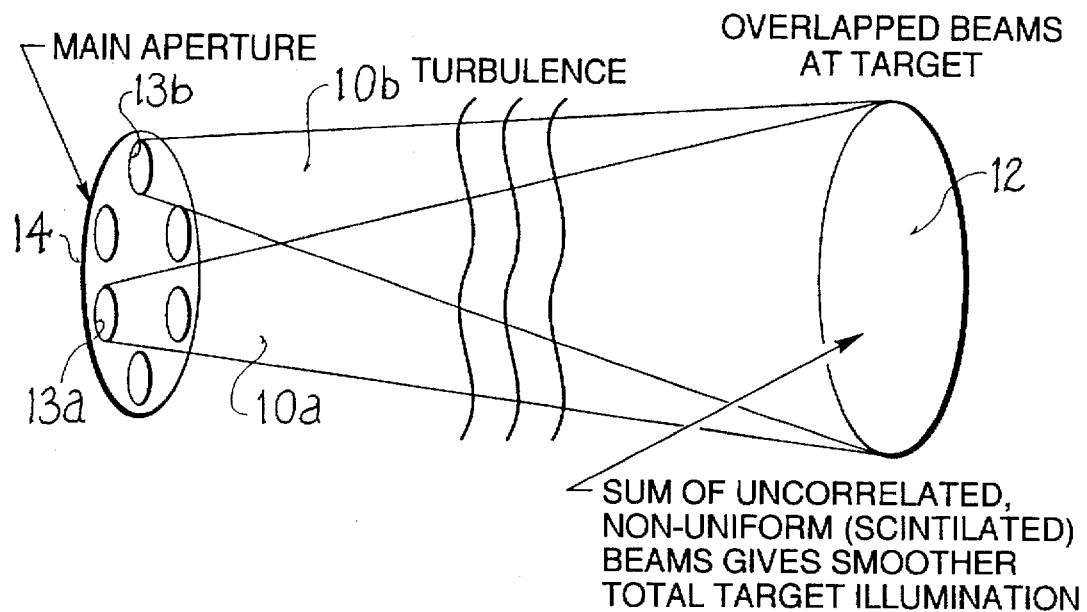
FIG_1
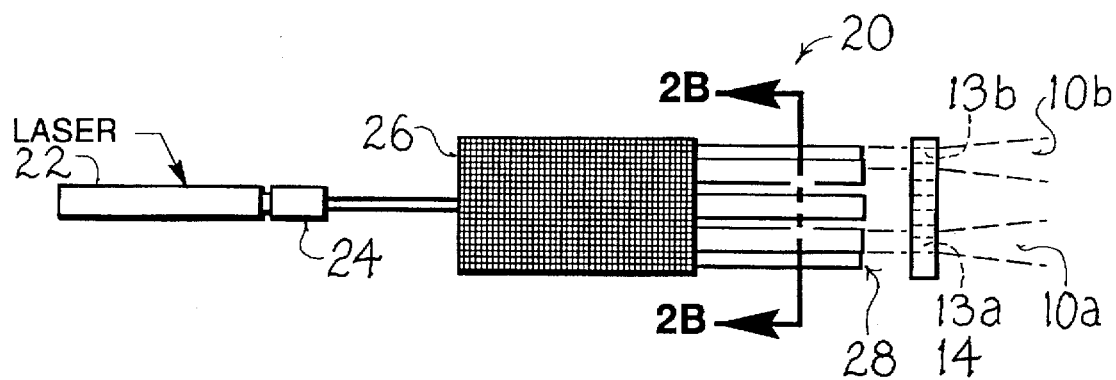
FIG_2A
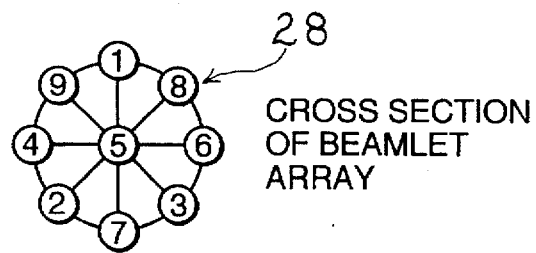
FIG_2B

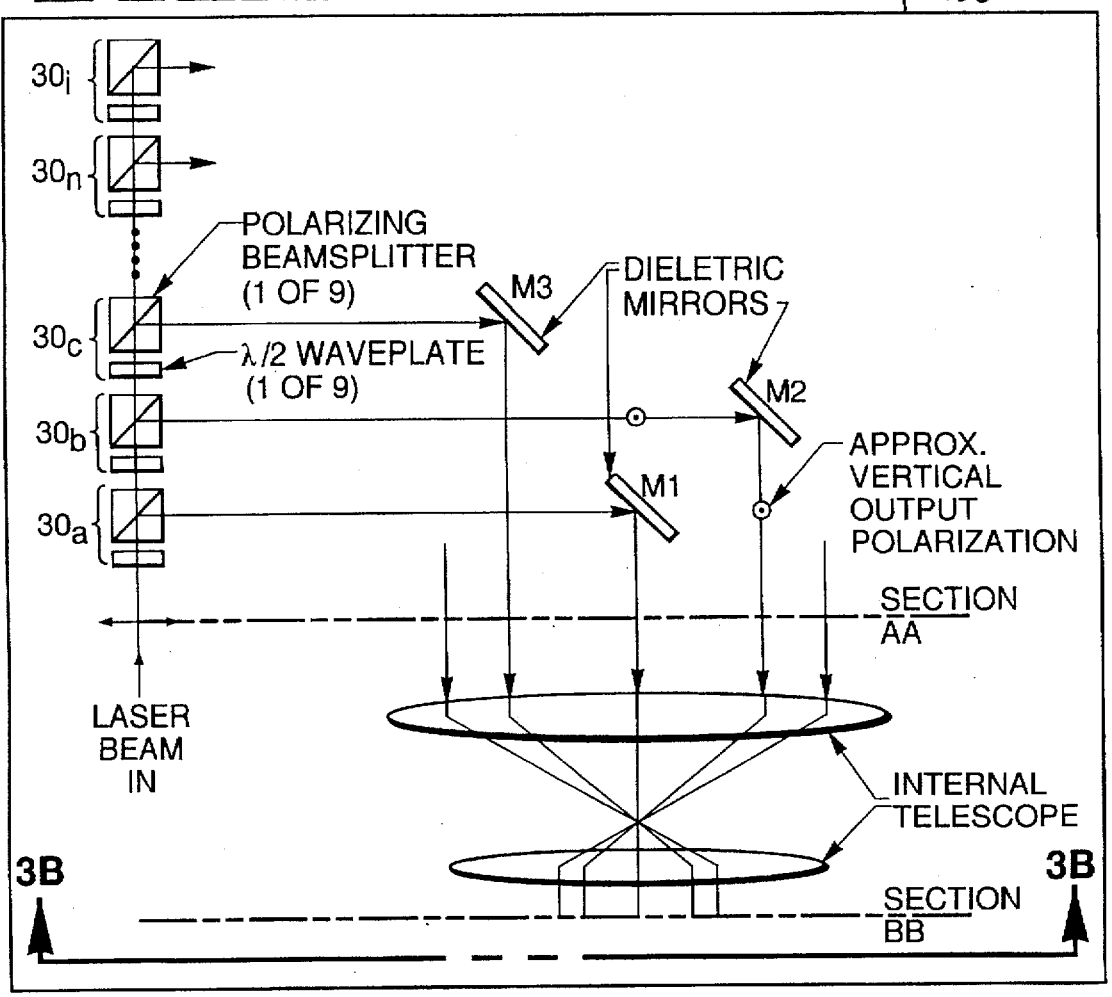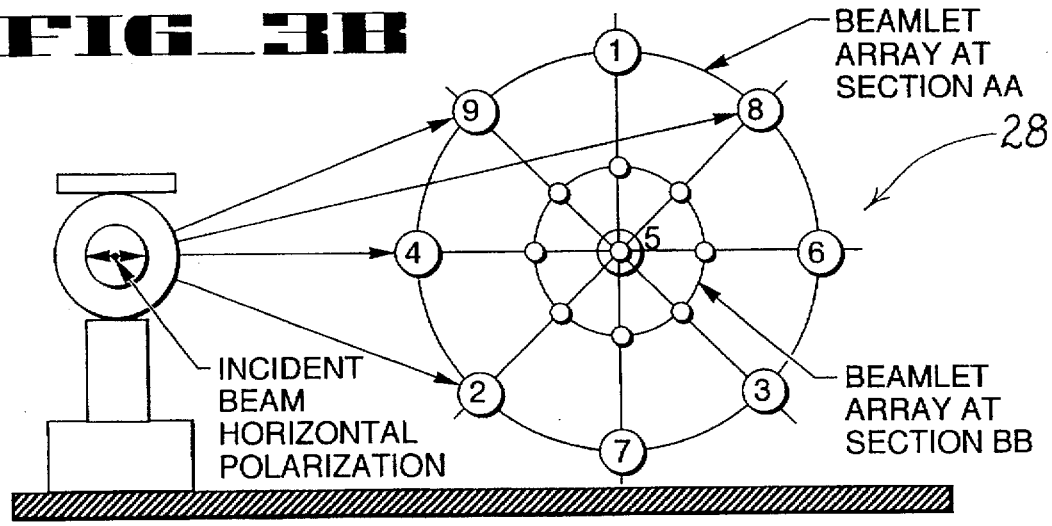

FIG_4A
IN-PLANE BEAM SEGMENTS
DOES NOT ALLOW CIRCULAR BEAMLET DISTRIBUTION
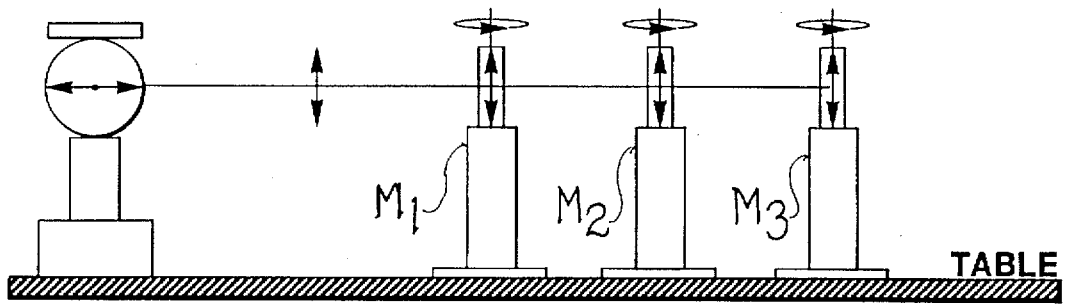
FIG_4B
OUT-OF-PLANE OBTAINED BY ROTATING EACH POLARIZING BEAMSPLITTER
ROTATE ABOUT THE INCIDENT BEAM K AXIS
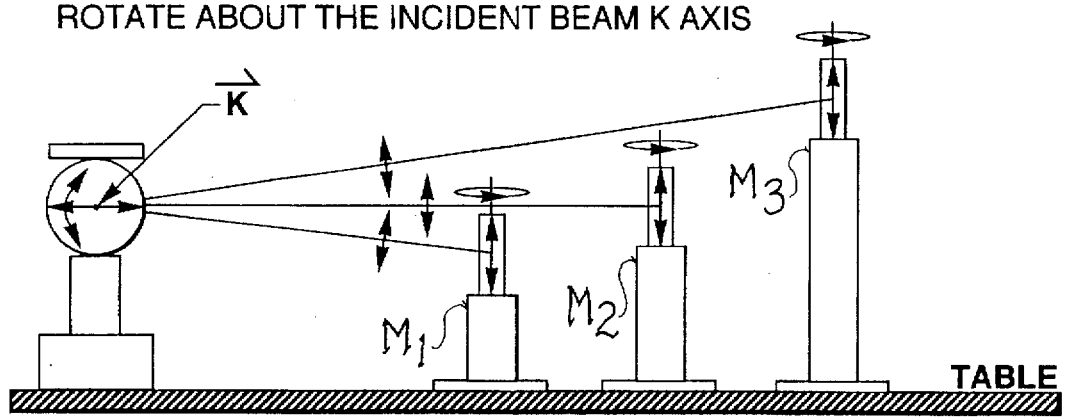
FIG_4C
BEAMS STRAIGHTENED BY USING PRISMS IN REQUIRED LEGS
NO UNWANTED POLARIZATION COMPONENT
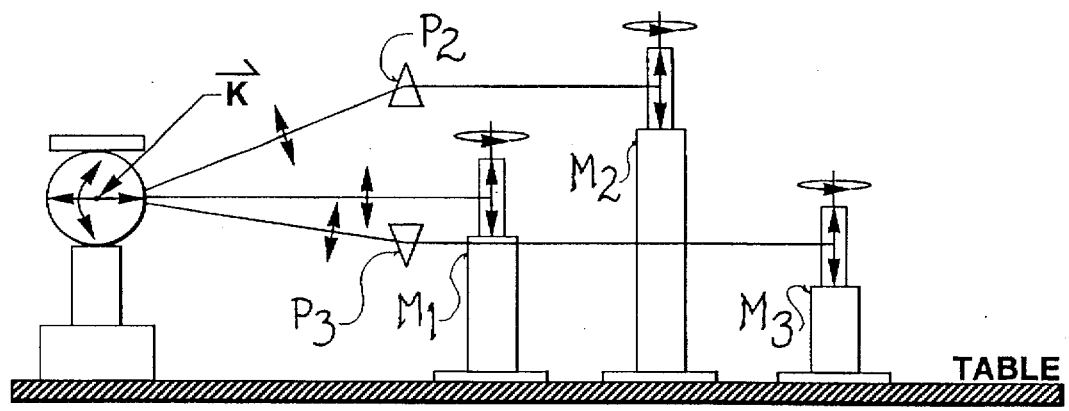

MULTI-BEAM ILLUMINATOR LASER

This application claims the benefit of U.S. provisional application 60/008,614 filed on Dec. 14, 1995.

TECHNICAL FIELD

The present invention relates to improvements in laser beam illumination of distant targets and remote objects. More particularly, the present invention relates to a multi-beam illuminator laser apparatus and method for providing uniformity of laser beam illumination of distant targets and objects and which is adaptable to changes in atmospheric conditions.

BACKGROUND OF THE INVENTION

Uniform illumination of a distant object, such as a missile target, by a remote laser is prevented by the scintillation of the laser beam as it traverses the turbulent atmosphere to reach the target. The laser beam is essentially passed through a large number of randomly-oriented, time-varying prisms which break it into many beamlets with slightly different direction. As these coherent (all having originated from a coherent wavefront of diameter D at the beam directing telescope) beamlets arrive at the target with random time-varying position, they interfere to provide a large variation of intensity with position on the target.

It has been speculated for some time that the use of many (say n) small mutually incoherent laser beams with diameter$\leq r_o$, where $r_o$ is the so-called "atmospheric coherence diameter" as defined by astrophysicist David Fried, separated spatially but originating within the same area $A=\pi D^2/4$, where D was the diameter of the single, coherent beam at the projection telescope, would, if focused to the target, provide more uniform illumination than that of the single beam. Wave code simulations performed under the direction of the inventor indicate this to be the case. For a complete discussion of the atmospheric coherence diameter, $r_o$, and other features of atmospheric turbulence and compensation, the reader is directed to the following reference: *Atmospheric-Compensation Technology*, J.Opt.Soc.Am., (R. Benedict, Jr., J. Breckinridge, David Fried, Editors) A, Vol. 11, No. 1, January 1994.

FIG. 1 provides a simple explanation for this prediction. FIG. 1 shows an array of small incoherent beamlets (note: only beamlets 10a and 10b are shown for purposes of clarity) which are used to replace a single coherent beam in order to minimize intensity variation of illumination at the remote target 12. In the region near the main aperture 14 (in this case, the main transmitting aperture of a transmitting telescope) the beamlets 10a, 10b, etc., originating from respective beam apertures 13a, 13b, etc., pass through different turbulent "prism" regions which provide each with a different scintillated pattern and direction. In the mid- and far-field range, the beamlets pass through essentially the same turbulence and are treated the same. Having been launched differently, they arrive and overlap differently at the target. On the other hand, if a single, coherent beam of the size of the main aperture left the main aperture, it would be handled by the prisms as essentially $\pi D^2/\pi r_o^2$ close-packed, adjacent coherent beams. These mutually coherent beams would be refracted similarly as the mutually incoherent ones, and thus their scintillation patterns would also overlap at the target. However, in contrast to the incoherent beamlets, these would destructively and constructively interfere at the target and thus give a large variation of intensity on the target as a function of position.

SUMMARY

The present invention is directed to a multi-beam illuminator laser apparatus to experimentally examine the possible beneficial effects of multi-beam illumination of remote objects. The following disclosure discusses the requirements that a multi-beam illuminator laser must satisfy in order to provide the data, and the unique apparatus that was developed.

The multi-beam illuminator laser provides a diameter-adjustable array consisting of a variable number of co-parallel, mutually incoherent, polarization-aligned, waist size- and position-adjustable beamlets. The invention includes a beam divider which efficiently uses laser power and because of this may be driven by as few as one laser or by as many as n lasers, where n is the beamlet number. The invention is capable of rather rapid adjustment of beamlet number and beamlet positions in the field. Finally, as the total number of beamlets and possibly their positions are varied, the overall beamlet array power is easily held constant by choice of the stage angles within the beam divider.

It is among the objects of the present invention that the output beamlets from the beam divider be co-parallel to a center reference beamlet.

It is another object of the invention that the output beamlets all be linearly polarized along a common, chosen axis.

It is another object of the invention that the output beamlets be mutually incoherent.

It is another object of the invention that each of the output beamlets has the same power, substantially P/n, where P is the total power of the input laser and n is the number of beamlets.

It is another object of the invention that the output beamlets all have the same diameter.

It is another object of the invention that the diameter of the output beamlets be adjustable.

It is another object of the invention that as few as one or as many as n input or source lasers can be utilized, where n is the number or beamlets that are present in the output beamlet array.

It is another object of the invention that the device be capable of selectively generating anywhere from one up to a maximum number of spatially separated beamlets, where a typical maximum number would be nine.

It is another object of the invention to use the input laser power in an efficient manner such that the total laser power from all the output beamlets is always equal to the input laser power, irrespective of changes in the selected number of output beamlets.

It is yet another object of the invention that the number and position of the output beamlets within the output array be adjustable in order to quickly compensate for changes in atmospheric conditions.

Further, it is an object of the invention to utilize known components having significant heritage and proven track performance in order to provide unique multi-beam illuminator laser design suitable for field operation.

Methods and apparatus which incorporate the features described above and which are effective to function as described above constitute specific objects of this invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 is a schematic illustration of the inventive concept of the present invention showing an array of small incoherent laser beamlets focused onto a distant target.

FIG. 2A is a block diagram which shows the principle elements of the multi-beam illuminator laser of the present invention.

FIG. 2B is a cross section view of the output beamlet array from the beam divider taken along the line and in the direction of arrows 2B—2B of FIG. 2A.

FIG. 3A illustrates the details of the beam divider shown in FIG. 2A.

FIG. 3B is an end view of the beam divider shown in FIG. 3A.

FIG. 4A illustrates a beam divider for obtaining a desired distribution of in-plane beamlets in accordance with one embodiment of the present invention.

FIG. 4B illustrates a beam divider for obtaining a desired spatial distribution of beamlets in accordance with another embodiment of the present invention.

FIG. 4C shows the beam divider of FIG. 4B with the addition of correcting prisms for completely eliminating unwanted polarization components of the output beamlets.

DETAILED DESCRIPTION OF THE INVENTION

FIG. 2 shows a block diagram of a multi-beam illuminator laser 20 in accordance with one embodiment of the present invention. The multi-beam illuminator laser 20 includes a light beam source or laser 22 for generating a coherent, linearly polarized light beam having a power P. A spatial filter and beam expander 24 adjusts the beam waist from the laser 22 to be centered in a beam divider 26 which produces a desired number and spatial distribution of output beamlets 28 for projection by a telescope 14.

FIG. 2B illustrates a cross section view of the output beamlet array 28. In this example, the output beamlet array 28 comprises a total of nine spatially separated beamlets (numbered 1–9 in FIG. 2A) including a center reference beamlet 5.

To fully appreciate the requirements of the invention it is easiest to consider the use of the multi-beam illuminator laser in an experiment. The following discussion is directed to an experiment conducted at the Massachusetts Institute of Technology's Firepond Facility located in Groton, Mass. The experiment tested various beam numbers in order to find the engineering optimum number for uniform illumination at a remote target. The results of the experiment confirmed previous wave code simulation predictions, viz. the greatest improvement is provided as the beam number is incrementally increased to four or five, and then slower improvement is seen as the beam number is further increased.

It is desirable that multi-beam illuminator laser of the present invention satisfy a number of general requirements. In particular, it is desired that: (1) the output beamlets 28 leave the beam divider 26 in co-parallel relation to the center reference beamlet 5; (2) the output beamlets 28 all be linearly polarized along the same, chosen axis; (3) the output beamlets 28 be mutually incoherent; (4) the output beamlets 28 all have the same diameter d, and (5) that the output beamlet diameter be adjustable. Further, although any number of separate lasers could produce the desired maximum number of beamlets, (6) it is desirable to be able to use as few as one laser 22. It is also desired (7) for the beam divider 26 to generate a maximum of number beamlets, where a typical maximum number of beamlets is nine. Furthermore, the number of beamlets used in any given atmospheric transmission experiment must be adjustable (8) in number and (9) in position.

For example, suppose three beamlets are desired. Referring to FIG. 2B, one choice would be reference beamlet 5 and beamlets 3 and 6. Another choice would be beamlets 5, 7, and 9. While the array of output beamlets 28 is shown to be rather symmetric, another requirement is that (10) the multi-beam illuminator laser 20 be adjustable to allow the positions of the output beamlets to be elsewhere within a prescribed circle. An important practical aspect of the apparatus, because an experiment will consist of transmitting the reference beam alone and then following it with n beams, is that because the atmosphere changes rather quickly, it is desirable that this change from 1 to n maximum beams can be made within a few moments. It is also required that (11) as the number of beamlets is varied, the total output laser power remains the same.

For example, if the power P of the laser 22 is chosen as 5 W, then with three beamlets in operation, each must deliver 5/3 W, or with five beamlets each must deliver 5/5=1 W. Note that an unsatisfactory "simple" solution of having the beam divider 26 simply provide all nine beamlets continuously and shutter off those not wanted for any n-beam case, is not consistent with the requirement that (12) the laser power must be used in a highly efficient fashion so as to minimize the laser volume, mass, cooling, and electrical power. Thus, to provide a single beam of 5 W it would, if beam blockage were used, require that each of the nine beamlets continuously carry 5 W, i.e. an excessive laser power of 45 W would be needed.

As will be seen from the following discussion, the multi-beam illuminator laser design of the present invention satisfies the above noted twelve general requirements.

Approximately ten concepts, with many variations, were considered for the achievement of uniform illumination of a remote object in the presence of atmospheric turbulence and scintillation. Broadly these could be characterized as having multiple beams, multiple laser modes, and temporal variation. Based upon numerous simulations and the practicalities of laser capability it was concluded that the multiple beam approach would be superior to the multi-mode approach. The temporal approach could not be examined within the available time and budget. It remains for future examination.

At the time the multiple beam approach was adopted and a device that would allow experimental investigation of it was designed, it was required to meet the general requirements listed previously, with additional requirements peculiar to the facility where the tests were to be performed, in this case the Massachusetts Institute of Technology's Firepond Facility. With regard to the Firepond facility, this was a 5.5 km laser beam propagation range with a laser beam source and beam director telescope which focuses the beam to a remote firetower which houses the remote target and reception sensing equipment. The specific additional requirements that this facility adds to the general requirement listed above include the requirement that: (i) the laser source be a single argon ion 8 W laser operating on the 514.5 nm line; (ii) the laser's measured coherence length is 12 cm; (iii) the radiometrics of the range and target require that approximately 4–5 W be the continuous power sum of the beamlets being used; (iv) the output array of co-aligned beamlets be of a prescribed small diameter so that when they leave the telescope they fit within the 21 cm prescribed scale size beam director of the facility; (v) the beamlets all have the same linear polarization; and (vi) the individual beamlets have a prescribed waist diameter so that when leaving the telescope they are about 4 cm, the $r_o$ of the site. As may be seen by comparison with the aforementioned requirements, these facility requirements are not new but merely add specificity to certain of those general requirements.

FIG. 3A illustrates the general multi-beam illuminator concept for the beam divider 26 alluded to above. For this experiment, the maximum number of beamlets has been chosen as M=9. Beamlet 5, being a reference beamlet, is located at the center of the output beamlet array 28 and the other beamlets are labeled as shown in FIG. 2B. As seen, the input laser beam passes axially through a linear array of nine units 30a, 30b, 30c . . . 30i, each of which includes a half-wave plate and a polarizing beamsplitter.

The $\lambda/2$ or "halfwave" waveplate rotates the angle of polarization of a linearly polarized beam passing through it by an angle $\Theta = 2\alpha$, where $\alpha$ is the angle between the polarization of the incoming wave and that of the crystalline optic axis of the waveplate. Thus if $\alpha$ is 0°, the output wave has the same polarization as the incoming; if $\alpha$ is 45°, the output beam is rotated 90°, thus changing an input horizontal polarization to a vertical output.

The polarizing cube beamsplitters have the property of separating the s- and p-polarized components of an incident beam into two highly polarized output beams separated by a 90° angle. In the arrangement shown in FIG. 3A, the vertically polarized component (s-polarized) is reflected out of the beamsplitter at right angles to the incident beam, while the horizontal component (p-polarized) passes through without deviation. For an incident power $P_o$ and polarization angle $\alpha$, the (small losses neglected) transmitted and reflected powers are given by $P_t = P_o \cos^2(2\alpha)$ $P_r = P_o \sin^2(2\alpha)$ Using the combination waveplate and polarizing prism together then allows the incident beam to be divided into a desired split of transmitted and side-reflected power according to the angle $\alpha$ that is chosen. For example, with input horizontal polarization from the laser 22, setting $\alpha 1$ of the waveplate of the first unit 30a to 45° reflects all of the laser power and transmits none. The full power of the laser 22 would then be reflected to a mining mirror M1 as seen which directs it to the input lens of a Newtonian telescope. After demagnification by the telescope, the output beamlet array 28, consisting in this case of only a single beam 1, would leave the beam divider 26 and go to the facility (transmitting) telescope.

If, on the other hand, the angle $\alpha 1$ were set to 22.5° then the horizontal polarization would be rotated 45° and $P_r = P_o \sin^2(2\alpha) = P_o \sin^2(45°) = P_o/2$.

Half of the power is thus reflected while half is transmitted. If the second in line waveplate-beamsplitter unit 30b is set to 0°, say, then the second unit 30b passes the $P_o/2$ beam with no change. Then if the third unit 30c were set to 45°, it would reflect out the entire $P_o/2$ beam it receives. The overall result of this arrangement would be two beamlets leaving the beam divider 26, beams 1 and 3, each having equal power of $P_o/2$, or a total array power of $P_o$ as required.

Note that we neglect here the small, few percent insertion loss which occurs at each stage. Other losses are negligible, being those associated with Fresnel front and back face reflections which are small by means of anti-reflection (AR) coatings on all waveplate, beamsplitter, and telescope optics faces.

In the above fashion the array of waveplate-beamsplitter units 30a–30i allows the operator to choose any of the nine available beamlets to be active and the operator has complete control of the amount of power reflected out of each one chosen. Table 3-1 illustrates a particular set of waveplate-beamsplitter unit angles that would provide one, two, etc. beams with all arrays giving the same output power. Other sequences can be chosen as the operator desires to change, for example, which three beamlets are used instead of those shown (beamlets 1, 5, and 7) in table 3-1.

TABLE 3-1

Waveplate Angle Settings to Provide 1–9 Beams

| Number of Beams | Angle Setting of Half-Waveplate, α(degrees) | | | | | | | | |
|---|---|---|---|---|---|---|---|---|---|
| | WP1 | WP2 | WP3 | WP4 | WP5 | WP6 | WP7 | WP8 | WP9 |
| 1 | 0 | 0.0 | 0.0 | 0.0 | 45.0 | 0.0 | 0.0 | 0.0 | 0.0 |
| 2 | 22.5 | 0.0 | 0.0 | 0.0 | 45.0 | 0.0 | 0.0 | 0.0 | 0.0 |
| 3 | 17.6 | 0.0 | 0.0 | 0.0 | 22.5 | 0.0 | 45.0 | 0.0 | 0.0 |
| 4 | 15.0 | 0.0 | 0.0 | 0.0 | 17.6 | 22.5 | 45.0 | 0.0 | 0.0 |
| 5 | 13.3 | 0.0 | 0.0 | 15.0 | 17.6 | 22.5 | 45.0 | 0.0 | 0.0 |
| 6 | 12.0 | 0.0 | 0.0 | 13.3 | 15.0 | 17.6 | 22.5 | 45.0 | 0.0 |
| 7 | 11.1 | 12.0 | 0.0 | 13.3 | 15.0 | 17.6 | 22.5 | 45.0 | 0.0 |
| 8 | 10.4 | 11.1 | 12.0 | 13.3 | 15.0 | 17.6 | 22.5 | 45.0 | 0.0 |
| 9 | 9.7 | 10.4 | 11.1 | 12.0 | 13.3 | 15.0 | 17.6 | 22.5 | 45.0 |

It should be noted that an issue with the concept as discussed thus far is that the output beamlets, and the corresponding mining mirrors and co-aligned beamlets would all lie in a single plane as seen in FIG. 4A. As discussed previously, a requirement for the multi-beam illuminator laser is to distribute the beamlets over the area of the circular transmitter aperture of the single laser beam that the multi-beam illuminator laser is replacing. To accomplish this, the polarizing beamsplitters of the units 30a–30i are rotated about the incident beam axis k, as shown in FIG. 4B. Note that a slight complication arises however in that the beams as they arrive at the turning mirrors M1–M9 then have a small component of polarization orthogonal to the vertical. This may be minimized by increasing the distance between the k axis and the tuning mirrors. The distance the mirror is above the midplane (zero rotation plane) and its distance from its beamsplitter. Thus with, for example, a maximum beamlet circular array of 5 cm radius, and the distance of 50 cm to incident beam axis, the fraction of orthogonal component is only 10%.

FIG. 4C shows one approach to eliminate even this small component of orthogonal polarization. As seen, small prisms P2, P3, . . . , Pn may be placed in the legs to refract them to be horizontal. Each prism angle is chosen for the appropriate angular deviation required.

With this use of the rotation of beamsplitters, the angle table which was shown above needs to be modified, viz. the zero angle for each waveplate is now shifted by the angle of rotation of its respective beamsplitter. Table 3-2 illustrates a typical modification of this kind with the zero angle settings shown below each waveplate label. (Note that these angles are measured on arbitrary scales on the waveplate rotation mounts and thus do not represent the much smaller actual angular rotation of the beamsplitters.) The beamlets that are excited at any step are shown in boxes.

TABLE 3-2

Absolute angle settings to obtain the beamlets shown

| Number of Beams | Angle Setting of Half-Waveplate, α(degrees) | | | | | | | | |
|---|---|---|---|---|---|---|---|---|---|
| | WP1 43.0° | WP2 48.5° | WP3 43.5° | WP4 42.0° | WP5 87.0° | WP6 40.0° | WP7 45.0° | WP8 48.5° | WP9 48.0° |
| 1 | 43.0 | 48.5 | 43.5 | 42.0 | 132.0 | 40.0 | 45.0 | 48.5 | 48.0 |
| 2 | 65.5 | 48.5 | 43.5 | 42.0 | 132.0 | 40.0 | 45.0 | 48.5 | 48.0 |
| 3 | 60.6 | 48.5 | 43.5 | 42.0 | 109.5 | 40.0 | 90.0 | 48.5 | 48.0 |
| 4 | 58.0 | 48.5 | 43.5 | 42.0 | 104.6 | 62.5 | 90.0 | 48.5 | 48.0 |
| 5 | 56.3 | 48.5 | 43.5 | 57.0 | 104.6 | 62.5 | 90.0 | 48.5 | 48.0 |
| 6 | 55.0 | 48.5 | 43.5 | 55.3 | 102.0 | 57.6 | 67.5 | 93.5 | 48.0 |
| 7 | 54.1 | 60.5 | 43.5 | 55.3 | 102.0 | 57.6 | 67.5 | 93.5 | 48.0 |
| 8 | 53.4 | 59.6 | 55.5 | 55.3 | 102.0 | 57.6 | 67.5 | 93.5 | 48.0 |
| 9 | 52.7 | 58.9 | 54.6 | 54.0 | 100.3 | 55.0 | 62.6 | 71.0 | 93.0 |

CONCLUSIONS

The previous discussion showed the design details of the multi-beam illuminator laser of the present invention. In the laboratory the multi-beam illuminator laser was found to achieve all of the general requirements and facility specific requirements discussed above. A brief summary and discussion of these requirements is presented below.

(1) The illuminator laser generate co-parallel beamlets. This requirement is satisfied by adjusting the turning mirrors M1, M2, . . . etc., while examining the beamlet array on a distant target.

(2) All beamlets have the same polarization. The technique of the present invention provides identical beam polarization in view of the small prisms that are used to eliminate the orthogonal component. For many purposes, however, sufficiently small amount of polarization mix can be obtained by the use of appropriate geometry.

(3) The beamlets must be mutually incoherent. This requirement is satisfied by making each successive beam path of the beamlets differ in length from its predecessor by at least the coherence length of the laser in use. For example, for the 12 cm Firepond laser value, this requires that the input face of the first waveplate be separated by at least 6 cm from the input face of the subsequent waveplate. (Note the return path from the mining mirror accounts for the other 6 cm.) This condition is easily meet by the longitudinal distribution of the arrays along the incident beam path.

(4) The beamlets should all have the same diameter. This is ensured by providing a very long, uniform beam waist throughout the approximately 1-meter length of waveplate-beamsplitter units by using the laser spatial filter/beam expander indicated.

(5) The beamlet diameter should be adjustable. Again, the laser spatial filter/beam expander allows this adjustment. Using the usual equations for gaussian beam propagation, one can determine the beam waist size required within the splitter array to achieve a specified beamlet waist size at the facility telescope, i.e. at a specified distance from the beam divider output.

(6) The invention should work with as few as one input laser. Clearly as was illustrated here this concept works with as few as one laser. The inventive concept of the present invention also allows the use of more than one laser. For example, if two lasers were to be used, the input from the principle or first laser would follow the same entry as that shown above. Then the second laser beam would enter between the fifth and sixth units 30e and 30f, respectively, where a turning mirror would direct the beam to follow the axial path that was formerly followed in the single laser case. The use of a larger number of lasers would follow a similar prescription.

(7) The multi-beam illuminator laser should be capable of generating an arbitrary number of beamlets. This is ensured by simply varying the waveplate angles as discussed above.

(8) The number of beamlets in the output array must be quickly adjustable. It has been found that with practice, the angular adjustments needed to change beam number only require a few moments.

(9) The positions of the beams should also be easily chosen during an experiment. Again, the angles of particular waveplate/beamsplitter units assure this. Thus, if two beams are desired, beamlets 1 and 2 could be chosen, or beamlets 3 and 9, etc. This only requires a few moments of adjustment.

(10) The apparatus should allow adjustment to obtain beamlets at other positions within the 1-beam transmitting aperture. Changing the rotation angles of the beamsplitters and the mirror positions and angular pointing allows other beamlet positions than those shown. For example, some of the beams currently shown on the circle could be brought into the center region closer to reference beamlet 5.

(11) The invention must allow the total array output power to remain fixed independent of the number of beams chosen. This requirement has been illustrated above. See, for example, Table 3-2 which shows the angles to achieve this. If the small, stage-to-stage losses are included, then a slightly modified angular table results. This has been experimentally found to agree with theory and will not be further discussed in this disclosure.

(12) The invention must ensure that each beamlet has the same power, substantially P/n, where P is the total power of the input laser and n is the number of beamlets.

(13) The laser power must be used in a highly efficient fashion. This is especially true for the present design since all components may be antireflection (AR) coated to minimize Fresnel losses and the insertion losses for the beamsplitters can be as low as 2% per stage. This is a highly efficient design.

It should be understood that various modifications within the scope of this invention can be made by one of ordinary skill in the art without departing from the spirit thereof. I therefore wish my invention to be defined by the scope of the appended claims as broadly as the prior art will permit, and in view of the specification if need be.

I claim:

1. A multi-beam illuminator laser for providing improved uniformity of laser beam illumination of a remote object in the presence of atmospheric turbulence, comprising:
   a) light beam generating means for generating a coherent, linearly polarized light beam having a total power;
   b) light beam dividing means for dividing said coherent light beam generated by said light beam generating means into a circular array of spatially separated, coparallel, mutually incoherent beamlets of equal power and equal diameter (d) and wherein:
      i) the sum power of said beamlets is substantially equal to said total power of said light beam generated by said light beam generating means;

ii) all of said beamlets are linearly polarized along a same chosen axis;

c) transmitting means for transmitting said array of beamlets onto a remote object; and d) whereby individual scintillation patterns of the transmitted beamlets that occur upon travelling through atmospheric turbulence overlap in an additive manner so that intensity variation of illumination at the remote object is minimized.

2. A multi-beam illuminator laser according to claim 1 wherein said light beam dividing means further includes internal scaling means for scaling said array of beamlets to match an input aperture diameter of said transmitting means and for putting a focus onto each of said beamlets such that at said transmitting means, $d \leq r_o$, where $r_o$ is the Fried atmospheric coherence diameter.

3. A multi-beam illuminator laser according to claim 2 wherein said light beam dividing means includes adjusting means for selectively adjusting the number and spatial location of said beamlets within said array to be transmitted by said transmitting means onto said remote object.

4. A multi-beam illuminator laser according to claim 2 wherein said light beam dividing means comprises a linear array of plural optical units, each optical unit associated with a particular one of said plurality of beamlets, and wherein each optical unit includes:

a) a rotatable waveplate having a crystalline optic axis which is effective to rotate an angle of polarization of an incoming linearly polarized light beam by an angle $\Theta=2\alpha$, wherein $\alpha$ is selected from a range of polarization angles between the polarization of said incoming light beam and a polarization of said crystalline optic axis of said waveplate;

b) a polarizing cube beamsplitter effective to separate s- and p-polarized components of said incoming light beam into two polarized output beam portions including a transmitted beam portion and a side reflected beam portion; and c) a turning mirror for directing said side reflected beam portion from said polarizing beam splitter to an input of said transmitting means.

5. A multi-beam illuminator laser according to claim 4 wherein said polarizing beamsplitter of selected ones of said optical units is rotatable about an incident beam axis to provide out-of-plane distribution of a respective side reflected beam portion within said array.

6. A multi-beam illuminator laser according to claim 5 where said selected ones of said optical units further includes at lease one prism disposed between said polarizing beam splitter and said turning mirror, said prism oriented to remove an orthogonal component of said respective side reflected beam portion.

7. A multi-beam illuminator laser according to claim 1 which includes beam expanding means for increasing a waist diameter of said coherent, linearly polarized light beam prior to being divided into said array of beams by said light beam dividing means.

8. A multi-beam illuminator laser according to claim 3 which includes beam expanding means for increasing a waist diameter of said coherent, linearly polarized light beam prior to being divided into said array of beams by said light beam dividing means.

9. A method of obtaining improved uniformity of laser beam illumination of a remote object in the presence of atmospheric turbulence, the method comprising the steps of:

generating a coherent, linearly polarized laser beam having a total power;

dividing the generated coherent, linearly polarized laser beam into an array of spatially separated, coparallel, mutually incoherent beamlets of equal power and equal diameter (d), and wherein:

the sum power of the beamlets is substantially equal to the total power of the generated light beam;

all of the beamlets are linearly polarized along a same chosen axis;

transmitting the array of beamlets onto a remote object; and whereby individual scintillation patterns of the transmitted beamlets that occur upon travelling through atmospheric turbulence overlap an additive manner so that intensity variation of illumination at the remote object is minimized.

10. The method according to claim 9 which includes the step of scaling said array of beamlets to match an input aperture diameter of said transmitting means and for putting a focus onto each of said beamlets such that at said transmitting means, $d \leq r_o$, where $r_o$ is the Fried atmospheric coherence diameter.

11. The method according to claim 9 which includes the step of selectively adjusting the number and spatial location of said beamlets within said array for projection onto the remote object in order to obtain optimum illumination of the remote object in accordance with changes in atmospheric conditions.

12. The method according to claim 9 which includes the step of expanding a waist diameter of said coherent, linearly polarized light beam prior to said dividing step.

* * * * *